United States Patent [19]
Weber et al.

[11] Patent Number: 5,998,533
[45] Date of Patent: Dec. 7, 1999

[54] PROCESS FOR PRODUCING MASKED POLYARYLENE ETHERS

[75] Inventors: Martin Weber, Maikammer; Christian Fischer, Ludwigshafen, both of Germany

[73] Assignee: BASF Aktiengesellschaft, Ludwigshafen, Germany

[21] Appl. No.: 08/981,318
[22] PCT Filed: Jul. 9, 1996
[86] PCT No.: PCT/EP96/02990
  § 371 Date: Dec. 11, 1997
  § 102(e) Date: Dec. 11, 1997
[87] PCT Pub. No.: WO97/04018
  PCT Pub. Date: Feb. 6, 1997

[30] Foreign Application Priority Data
Jul. 22, 1995 [DE] Germany .......................... 195 26 855

[51] Int. Cl.$^6$ .......................... C08L 71/10; C08L 77/00; C08L 81/06; C08G 65/48
[52] U.S. Cl. .......................... 524/540; 524/538; 524/611; 525/66; 525/68; 525/133; 525/420; 525/471; 525/534; 525/535
[58] Field of Search ...................................... 525/534, 471, 525/535, 397, 420; 324/540, 611, 538

[56] References Cited

U.S. PATENT DOCUMENTS

| | | |
|---|---|---|
| 2,071,250 | 2/1937 | Carothers . |
| 2,071,251 | 2/1937 | Carothers . |
| 2,130,523 | 9/1938 | Carothers . |
| 2,130,948 | 9/1938 | Carothers . |
| 2,241,322 | 5/1941 | Hanford . |

(List continued on next page.)

FOREIGN PATENT DOCUMENTS

| | | |
|---|---|---|
| 361 | 1/1979 | European Pat. Off. . |
| 38 094 | 10/1981 | European Pat. Off. . |
| 39 524 | 11/1981 | European Pat. Off. . |
| 113 112 | 7/1984 | European Pat. Off. . |
| 129 195 | 12/1984 | European Pat. Off. . |
| 129 196 | 12/1984 | European Pat. Off. . |
| 135 130 | 3/1985 | European Pat. Off. . |
| 195 448 | 9/1986 | European Pat. Off. . |
| 213 637 | 3/1987 | European Pat. Off. . |
| 288 974 | 11/1988 | European Pat. Off. . |
| 38 43 438 | 6/1990 | Germany . |
| 41 14 455 | 11/1992 | Germany . |
| 1 555 384 | 11/1979 | United Kingdom . |
| 84/03892 | 10/1984 | WIPO . |

OTHER PUBLICATIONS

Macromolecules 1981, 14, 410–419.
Polymer Eng. and Sci, Aug. 1977, vol. 17, No. 8.
High Performance Polymer, vol. 2, No. 3, 1990, pp. 189–195.
C.L. Meyers, 1420/ANTEC '92.

Primary Examiner—Patricia A. Short
Attorney, Agent, or Firm—Keil & Weinkauf

[57] ABSTRACT

Polyarylene ethers having repeating units of the general formula I

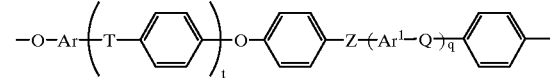

where
  t and q may each be an integer 0, 1, 2 or 3,
  T, Q and Z may each be a chemical bond or a group selected from —O—, —S—, —SO$_2$—, S=O, C=O, —N=N—, —R$^a$C=CR$^b$— and —CR$^c$R$^d$—, with the proviso that at least one of the groups T, Q or Z is —SO$_2$— or C—O and, if t and q are 0, Z is —SO$_2$— or C=O,
  R$^a$ and R$^b$ are each hydrogen or C$_1$–C$_{10}$-alkyl,
  R$^c$ and R$^d$ are each hydrogen, C$_1$–C$_{10}$-alkyl, C$_1$–C$_{10}$-alkoxy or C$_6$–C$_{18}$-aryl, where the abovementioned groups may each be substituted by fluorine and/or chlorine, or, together with the carbon atom to which they are bonded, form a C$_4$–C$_7$-cycloalkyl group which may be substituted by one or more C$_1$–C$_6$-alkyl groups, and
  Ar and Ar$^1$ are each C$_6$–C$_{18}$-aryl which may be unsubstituted or substituted by C$_1$–C$_{10}$-alkyl, C$_6$–C$_{18}$-aryl, C$_1$–C$_{10}$-alkoxy or halogen,
and terminal anhydride groups of the formula II

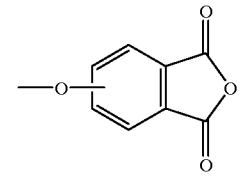

(polyarylene ether A), are prepared by a process in which polyarylene ethers having repeating units of the formula I and terminal hydroxyl groups (polyarylene ethers A') are reacted with phthalic anhydrides of the formula III

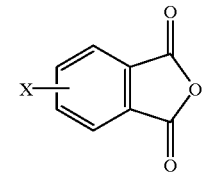

where X is fluorine, chlorine, bromine or iodine, in a solvent in the presence of potassium fluoride.

8 Claims, No Drawings

U.S. PATENT DOCUMENTS

| | | |
|---|---|---|
| 2,312,966 | 3/1943 | Hanford . |
| 2,512,606 | 6/1950 | Bolton et al. . |
| 3,393,210 | 7/1968 | Speck . |
| 3,441,538 | 4/1969 | Marks . |
| 4,108,837 | 8/1978 | Johnson et al. . |
| 4,642,327 | 2/1987 | Matzner et al. . |
| 5,457,169 | 10/1995 | Weber ................................. 525/534 |
| 5,612,425 | 3/1997 | Weber ................................. 525/534 |

PROCESS FOR PRODUCING MASKED POLYARYLENE ETHERS

The present invention relates to a process for the preparation of polyarylene ethers having repeating units of the general formula I

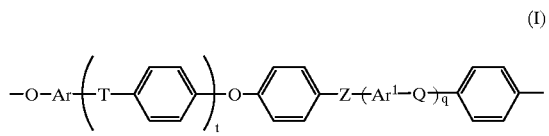

where
t and q may each be an integer 0, 1, 2 or 3,
T, Q and Z may each be a chemical bond or a group selected from —O—, —S—, —SO$_2$—, S=O, C=O, —N=N—, —R$^a$C=CR$^b$— and —CR$^c$R$^d$—, with the proviso that at least one of the groups T, Q or Z is —SO$_2$— or C=O and, if t and q are 0, Z is —SO$_2$— or C=O, R$^a$ and R$^b$ are each hydrogen or C$_1$–C$_{10}$-alkyl, R$^c$ and R$^d$ are each hydrogen, C$_1$–C$_{10}$-alkyl, C$_1$–C$_{10}$-alkoxy or C$_6$–C$_{18}$-aryl, where the abovementioned groups may each be substituted by fluorine and/or chlorine, or, together with the carbon atom to which they are bonded, form a C$_4$–C$_7$-cycloalkyl group which may be substituted by one or more C$_1$–C$_6$-alkyl groups, and Ar and Ar$^1$ are each C$_6$–C$_{18}$-aryl which may be unsubstituted or substituted by C$_1$–C$_{10}$-alkyl, C$_6$–C$_{18}$-aryl, C$_1$–C$_{10}$-alkoxy or halogen, and terminal anhydride groups of the formula II

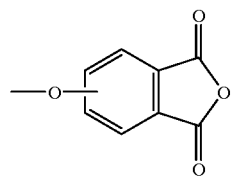

(polyarylene ether A).

The present invention furthermore relates to the use of the polyarylene ethers A prepared by the novel process for the preparation of molding materials and to the molding materials themselves.

Polyarylene ethers having terminal anhydride groups which are linked to the polymer chain via ester groups were disclosed in EP-A-613 916. This publication also discloses blends with polyamides.

The binding of the terminal anhydride groups to the polyarylene ethers can also be effected, as described by C. L. Myers, ANTEC '92, 1992, 1, 1420, by reacting amino-terminated polyarylene ethers with an excess amount of a dianhydride.

U.S. Pat. No. 4,642,327 disclosed a process for the preparation of oligomeric arylene ethers having terminal anhydride groups bonded via oxygen. According to this publication, dialkali metal salts of the oligomers are reacted with a 1,2-dicyanonitrobenzene in a first step. In a second step, the dinitriles are hydrolyzed and then cyclized to give the anhydrides. The higher the molecular weights of the arylene ethers used, the less feasible is this process since the intermediate is difficult to purify. Accordingly, this process too is unsuitable for commercial purposes.

It is only for low molecular weight phenols that it has been stated that these can be reacted with halophthalic anhydrides (W. T. Schwartz, High Performance Polymers, 2 (1990) 189).

It is an object of the present invention to provide a process for the preparation of polyarylene ethers having terminal anhydride groups linked via oxygen, as described at the outset, which process also makes it possible to obtain higher molecular weight polymers.

We have found that this object is achieved by a process in which polyarylene ethers having repeating units of the general formula I and terminal hydroxyl groups (polyarylene ethers A') are reacted with phthalic anhydrides of the general formula III

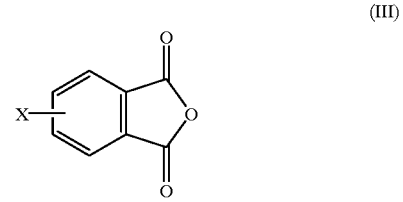

where X is fluorine, chlorine, bromine or iodine, in a solvent in the presence of potassium fluoride.

t and q stated in the general formula I

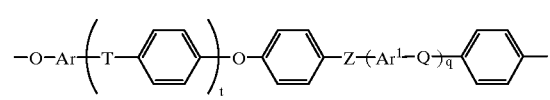

may each be 0, 1, 2 or 3. T, Q and Z, independently of one another, may be identical or different. They may be a chemical bond or a group selected from —O—, —SO$_2$—, —S—, C=O, —N=N— and S=O. In addition, T, Q and Z may also be a group of the general formula —R$^a$C=CR$^b$— or —CR$^c$R$^d$—, where R$^a$ and R$^b$ are each hydrogen or C$_1$–C$_{10}$-alkyl, R$^c$ and R$^d$ are each hydrogen, C$_1$–C$_{10}$-alkyl, such as methyl, ethyl, n-propyl, isopropyl, tert-butyl or n-hexyl, C$_1$–C$_{10}$-alkoxy, such as methoxy, ethoxy, n-propoxy, isopropoxy or n-butoxy, or C$_6$–C$_{18}$-aryl, such as phenyl or naphthyl. R$^c$ and R$^d$, together with the carbon atom to which they are bonded, may also be linked to form a cycloalkyl ring of 4 to 7 carbon atoms. Among these, cyclopentyl and cyclohexyl are preferred. The cycloalkyl rings may be unsubstituted or substituted by one or more, preferably two or three, C$_1$–C$_6$-alkyl groups. The preferred substituents of the cycloalkyl rings include methyl. Preferably used polyarylene ethers A' are those in which T, Q and Z are each —O—, —SO$_2$—, C=O, a chemical bond or a group of the formula —CR$^c$R$^d$. The preferred radicals R$^c$ and R$^d$ include hydrogen and methyl. Of the groups T, Q and Z, at least one is —SO$_2$— or C=O. If t and q are each 0, Z is either —SO$_2$— or C=O, preferably —SO$_2$—. Ar and Ar$^1$ are each C$_6$–C$_{18}$-aryl, such as 1,5-naphthyl, 1,6-naphthyl, 2,7-naphthyl, 1,5-anthryl, 9,10-anthryl, 2,6-anthryl, 2,7-anthryl or biphenyl, in particular phenyl. These aryl groups are preferably unsubstituted. However, they may have one or more, for example two, substituents. Suitable substituents are C$_1$–C$_{10}$-alkyl, such as methyl, ethyl, n-propyl, isopropyl, tert-butyl or n-hexyl, C$_6$–C$_{18}$-aryl, such as phenyl or naphthyl, C$_1$–C$_{10}$-alkoxy, such as methoxy, ethoxy, n-propoxy, isopropoxy or n-butoxy, and halogen. The preferred substituents among these include methyl, phenyl, methoxy and chlorine.

Some suitable repeating units are shown below:

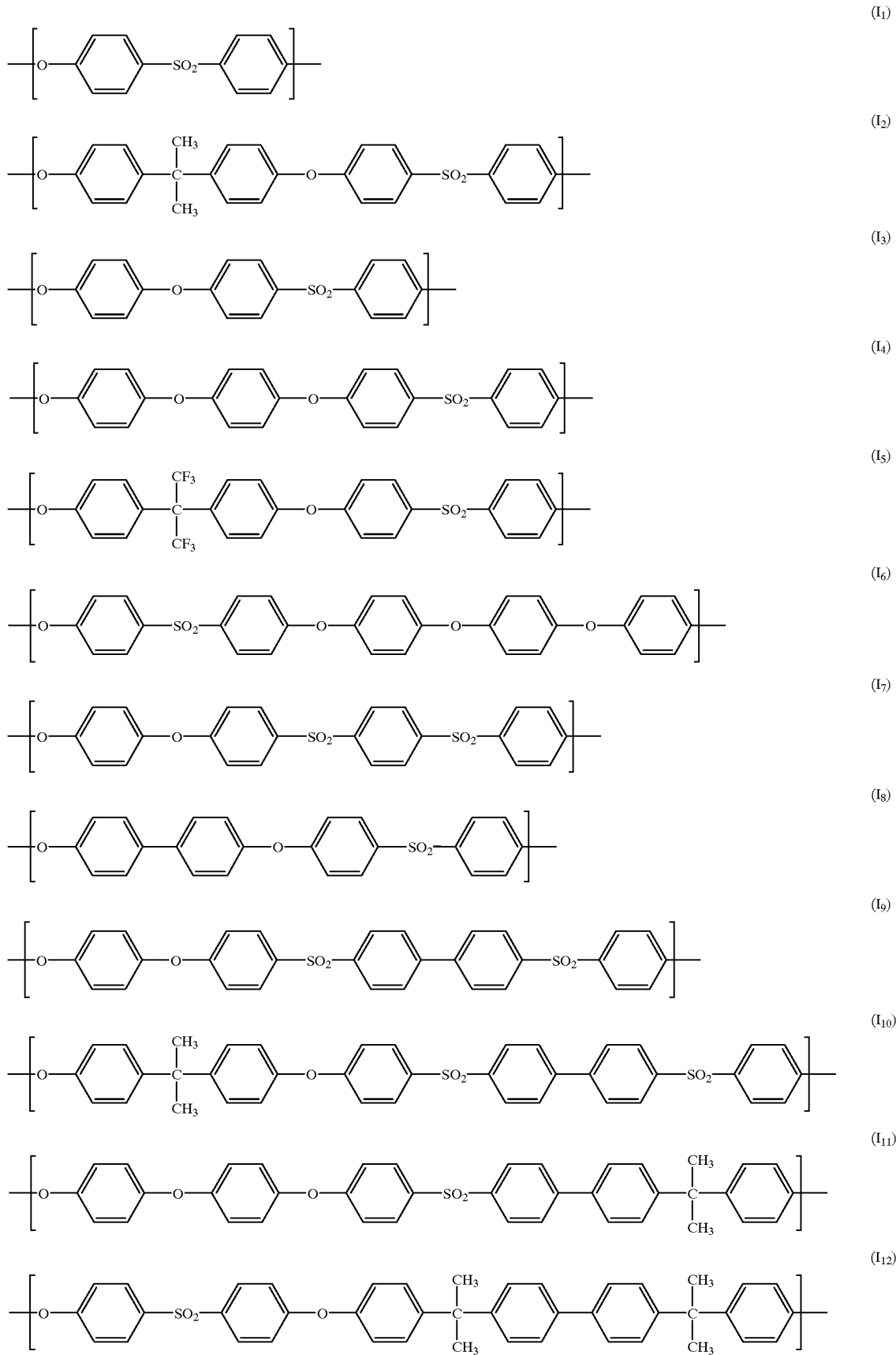

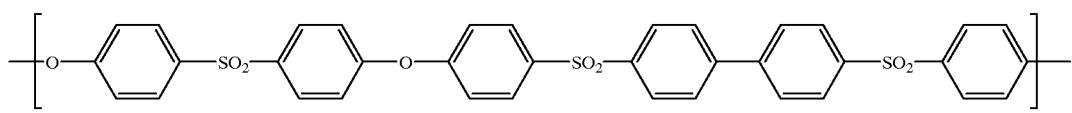
(I₁₃)
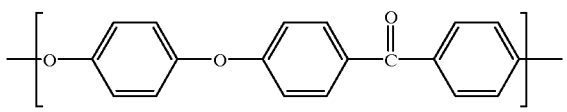
(I₁₄)
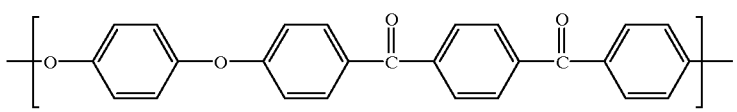
(I₁₅)
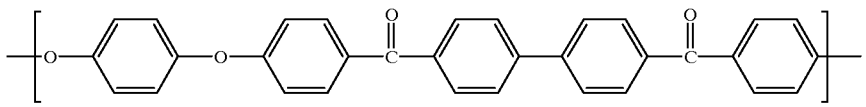
(I₁₆)
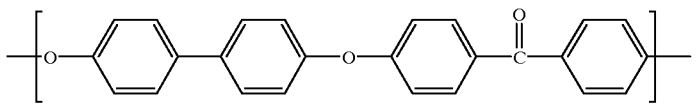
(I₁₇)
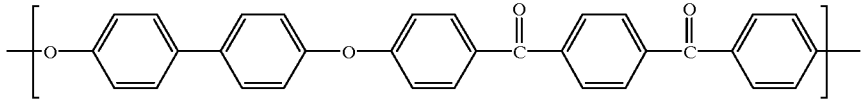
(I₁₈)
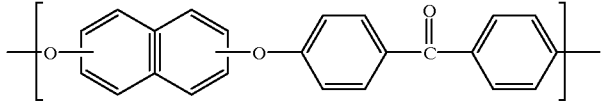
(I₁₉)
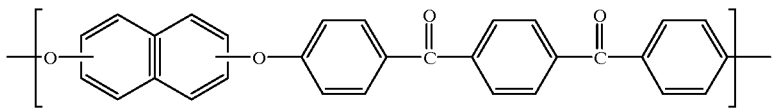
(I₂₀)
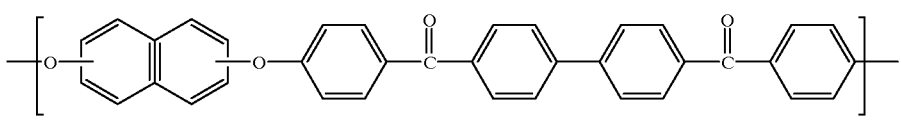
(I₂₁)
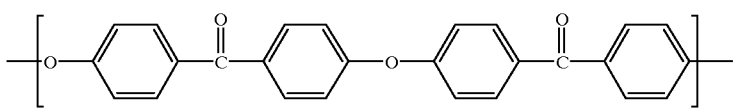
(I₂₂)
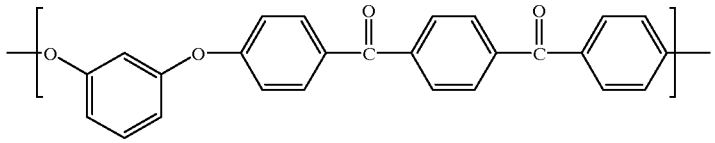
(I₂₃)

-continued

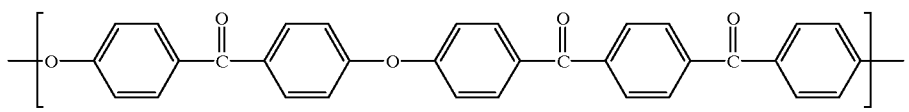
(I₂₄)

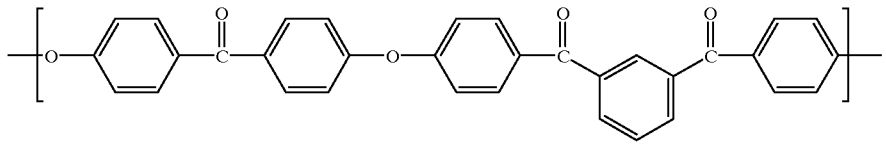
(I₂₅)

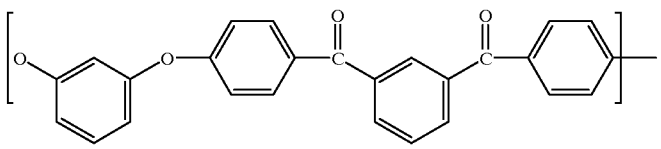
(I₂₆)

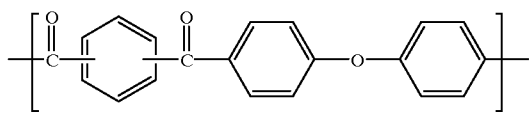
(I₂₇)

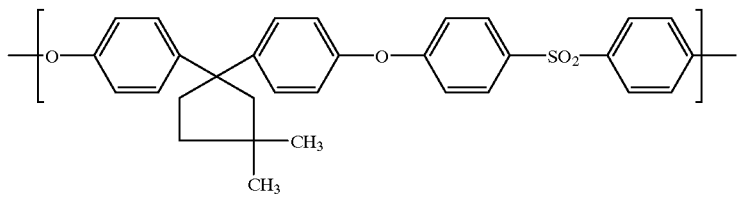
(I₂₈)

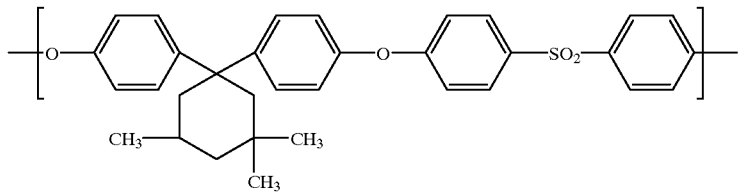
(I₂₉)

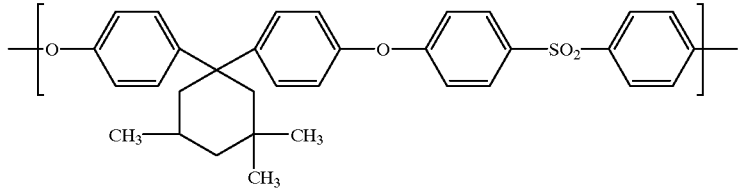
(I₃₀)

Very particularly preferred polyarylene ethers A' are those having repeating units (I₁), (I₂), (I₈), (I₂₄) or (I₂₅). These include, for example, polyarylene ethers A' having from 0 to 100 mol % of repeating units (I₁) and from 0 to 100 mol % of repeating units (I₂).

The polyarylene ethers A' may also be copolymers or block copolymers in which polyarylene ether segments and segments of other thermoplastic polymers, such as polyamides, polyesters, aromatic polycarbonates, polyestercarbonates, polysiloxanes, polyimides or polyetherimides, are present. Such copolymers or block copolymers each contain at least one outer polyarylene ether segment having a terminal hydroxyl group. The number average molecular weights of the blocks or of the grafts in the copolymers are, as a rule, from 1000 to 30,000 g/mol. The blocks of different structures may be arranged alternately or randomly. The copolymers or block copolymers generally contain at least 10% by weight, and may contain up to 97% by weight, of the polyarylene ethers. Copolymers or block copolymers containing up to 90% by weight of polyarylene ethers are preferred and those containing from 20 to 80% by weight of polyarylene ethers are particularly preferred.

In general, the polyarylene ethers A' have number average molecular weights $\overline{M}_n$ of from 5000 to 60,000 g/mol and relative viscosities of from 0.20 to 0.95 dl/g. Depending on the solubility of the polyarylene ethers, the relative viscosities are measured either in 1% strength by weight solution in N-methylpyrrolidone, in mixtures of phenol and dichlorobenzene or in 96% strength sulfuric acid, in each case at 20° C. or 25° C.

Polyarylene ethers having repeating units I are known per se and can be prepared by known methods.

They are formed, for example, by condensation of aromatic bis-halogen compounds and the alkali metal double salts of aromatic bisphenols. They can also be prepared, for example, by autocondensation of alkali metal salts of aromatic halophenols in the presence of a catalyst. DE-A-38 43 438 gives, for example, a detailed list of suitable monomers. Suitable processes are described in, inter alia, U.S. Pat. Nos. 3,441,538 and 4,108,837, DE-A1-27 38 962 and EP-A1-361. Polyarylene ethers which contain carbonyl functions are also obtainable by electrophilic (Friedel-Crafts) polycondensation, as described in, inter alia, WO 84/03892. In the electrophilic polycondensation, the carbonyl bridges are formed either by reacting dicarbonyl chlorides or phosgene with aromatics which contain two hydrogen atoms replaceable by electrophilic substituents or by subjecting an aromatic carbonyl chloride which contains both an acyl chloride and a substitutable hydrogen atom to autopolycondensation.

Preferred process conditions for the synthesis of polyarylene ethers are described, for example, in EP-A-113 112 and 135 130. The reaction of the monomers in aprotic solvents, in particular N-methylpyrrolidone, in the presence of anhydrous alkali metal carbonate, in particular potassium carbonate, is particularly suitable. Reacting the monomers in the melt has also proven advantageous in many cases.

Polyarylene ethers having repeating units I and terminal hydroxyl groups can be prepared, for example, by a suitable choice of the molar ratio of dihydroxy to dichloro monomers (cf. for example J. E. McGrath et al: Polym. Eng. Sci. 17 (1977), 647; H.-G. Elias "Makromoleküle" 4th Edition, pages 490–493, (1981), Hüthig & Wepf-Verlag, Basel).

Polyarylene ethers A' which have from 0.02 to 2% by weight of terminal hydroxyl groups are preferably used. Those which have from 0.1 to 1.5% by weight of terminal hydroxyl groups are very particularly preferred.

According to the invention, the polyarylene ethers A' are reacted with phthalic anhydrides of the general formula III. Among these, the chlorophthalic anhydrides and the fluorophthalic anhydrides are preferred. 3-Fluorophthalic anhydride or 3-chlorophthalic anhydride is particularly preferably used. However, it may also be advantageous to use a mixture of different phthalic anhydrides III, for example a mixture of 3-fluorophthalic anhydride and 3-chlorophthalic anhydride. It is possible to react the different phthalic anhydrides III simultaneously with the polyarylene ethers A'. However, it is also possible to react these in succession, for example first 3-fluorophthalic anhydride and then 3-chlorophthalic anhydride.

The reaction of the hydroxy-terminated polyarylene ethers A' with the phthalic anhydrides (III) to give the polyarylene ethers A takes place, according to the invention, in a solvent, in particular a solvent in which the polyarylene ethers A', the phthalic anhydrides III and potassium fluoride have sufficiently high solubility. Examples of suitable organic solvents are aliphatic or aromatic sulfoxides and sulfones, such as dimethyl sulfoxide, dimethyl sulfone, 1,1-dioxothiolane and diphenyl sulfone, among which dimethyl sulfoxide and diphenyl sulfone are preferred. N-Cyclohexylpyrrolidone, N,N-dimethylacetamide, dimethylformamide and N-methylpyrrolidone are also suitable. N-Methylpyrrolidone is particularly preferably used. In general, elevated temperatures are required for the reactions. As a rule, the reaction takes place only slowly at below 60° C. In general, temperatures of 100° C. or higher are required. The reactions take place in general at from 120 to 250° C. Temperatures higher than 230° C. are not generally required.

The reaction times required for the reaction are in general from 0.1 to 5 hours.

According to the invention, the reaction is carried out in the presence of potassium fluoride. In general, the potassium fluoride is used in stoichiometric amounts, based on phthalic anhydride III. However, the amount of potassium fluoride may also be higher than this, for example up to 10 mol per mol of phthalic anhydride III. It may also be slightly lower. In general, the reaction is no longer complete if the amount of potassium fluoride is less than 1 mol per mol of phthalic anhydride III. As a rule, the molar ratio of potassium fluoride to phthalic anhydride is from 1:1 to 7:1, preferably from 1.1:1 to 6:1.

The reaction can also be carried out in the presence of potassium carbonate. In general, from 0.05 to 10 mol of potassium carbonate are used per mol of potassium fluoride. However, the amount of potassium carbonate may also be smaller, for example, from 0.05 to 9 mol of potassium carbonate per mol of potassium fluoride. As a rule, there are no longer any advantages if potassium carbonate is added in amounts of more than 15 mol per mol of potassium fluoride. In general, the reaction is carried out in the presence of from 0.05 to 7 mol of potassium carbonate per mol of potassium fluoride. The reaction of the polyarylene ethers A' with the phthalic anhydrides may be carried out with both purified and isolated polyarylene ethers A'. However, it is also possible for this reaction to be carried out directly after the preparation of the polyarylene ethers A', without the latter being purified or isolated beforehand. The reaction product is preferably obtained by precipitation in a nonsolvent, for example, a lower molecular weight alcohol, such as methanol, ethanol, propanol or isopropanol, or water, or a mixture thereof. However, it is also possible to remove the reaction solvent from the reaction product, for example in a devolatilization extruder or thin-film evaporator, and thus to isolate the reaction product.

The amount of terminal anhydride groups in the polyarylene ether A can be determined by the known methods of general organic analysis, such as titration or IR, UV or NMR spectroscopy.

The polyarylene ethers A prepared by the novel process generally have the same molecular weights as the polyarylene ethers A' on which they are based, ie. there is little or no decrease in the molecular weight in the course of the reaction of A' with the phthalic anhydrides III.

The polyarylene ethers A thus prepared are distinguished by their very pale natural color and a high content of terminal anhydride groups.

They are suitable for the preparation of molding materials.

In one of the preferred embodiments, the molding materials contain the components A) from 5 to 99, in particular from 5 to 50, % by weight of polyarylene ether A, B) from 0 to 90, in particular from 15 to 80, % by weight of polyarylene ether B and C) from 1 to 45, in particular from 10 to 35, % by weight of fibrous or particulate reinforcing materials or fillers or mixtures thereof, the sum of components A to C being 100% by weight in each case.

In another preferred embodiment, the molding materials contain the components

A) from 1 to 99, in particuar from 10 to 90, % by weight of polyarylene ether A, B) from 0 to 90, in particular from 5 to 80, % by weight of polyarylene ether B, C) from 0 to 45, in particular from 10 to 35, % by weight of fibrous or particulate reinforcing materials or fillers or mixtures thereof, D) from 1 to 99, in particular from 10 to 90, % by weight of thermoplastic polyamides D and E) from 0 to 25, in particular from 2 to 20, % by weight of rubber impact modifiers E, the sum of components A to E being 100% by weight in each case.

Further molding materials which are preferred contain the components

A) from 10 to 88% by weight of polyarylene ether A,

B) from 0 to 80% by weight of polyarylene ether B,

D) from 10 to 88% by weight of thermoplastic polyamides D and

E) from 2 to 20% by weight of rubber impact modifiers E, the sum of the components being 100% by weight in each case.

Component B

In addition to the polyarylene ethers A, the molding materials may also contain polyarylene ethers B whose terminal groups differ from those of the polyarylene ethers A and which contain repeating units of the general formula IV

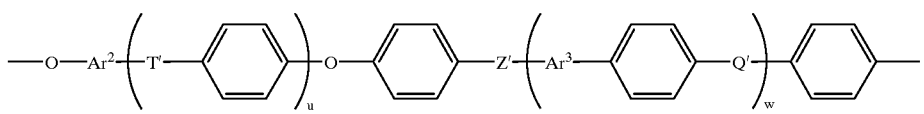

u and w have the same meanings as t and q. u and w may, but need not, be identical to t and q, ie. u and w, independently of t and q, may be identical to or different from these. T', Q' and Z' have the same meanings as T, Q and Z and may, but need not, be identical to T, Q and Z, ie. T', Q' and Z', independently of T, Q and Z, may be identical to or different from T, Q and Z. $Ar^2$ and $Ar^3$ may be identical to or different from Ar and $Ar^1$, ie. $Ar^2$ and $Ar^3$ may, but need not, be identical to Ar and $Ar^1$ and have the same meanings as Ar and $Ar^1$.

Copolymers containing polyarylene ether segments may also be used as component B.

The polyarylene ethers B may contain, for example, terminal halogen, methoxy, hydroxyl, phenoxy, benzyloxy or amino groups. Preferably used polyarylene ethers B are those having terminal halogen and/or methoxy groups.

As stated above, these polyarylene ethers B are known or are obtainable by known methods.

The polyarylene ethers B may be present in the novel molding materials in an amount of up to 90, preferably up to 80, % by weight.

Component C

In addition to the components A and B, the molding materials may also contain reinforcing agents or fillers. The novel molding materials may contain, as component C, for example up to 45, preferably from 10 to 35, % by weight of fibrous or particulate fillers or reinforcing materials or mixtures thereof.

Preferred fibrous fillers or reinforcing materials are carbon fibers, potassium titanate whiskers, aramid fibers and particularly preferably glass fibers. Where glass fibers are used, they may be treated with a size and an adhesion promoter to improve the compatibility with the matrix material. In general, the carbon fibers and glass fibers used have a diameter of from 6 to 20 μm.

The glass fibers can be incorporated in the form of both short glass fibers and rovings. In the finished infection molding, the average length of the glass fibers is preferably from 0.08 to 0.5 mm.

Carbon fibers or glass fibers may also be used in the form of woven fabrics, mats or glass rovings.

Suitable particulate fillers are amorphous silica, magnesium carbonate (chalk), powdered quartz, mica, talc, feldspar, glass beads and in particular calcium silicates, such as wollastonite and kaolin (in particular calcined kaolin).

Preferred combinations of fillers are, for example, 20% by weight of glass fibers with 15% by weight of wollastonite and 15% by weight of glass fibers with 15% by weight of wollastonite.

Component D

In addition to the components A to C, the novel molding materials may also contain thermoplastic polyamides. The polyamides contained as component D in the materials are likewise known and comprise semicrystalline and amorphous resins which have a weight average molecular weight of at least 5000 and are usually referred to as nylon. Such polyamides are described, for example, in U.S. Pat. Nos. 2,071,250, 2,071,251, 2,130,523, 2,130,948, 2,241,322, 2,312,966, 2,512,606 and 3,393,210.

The polyamides D can be prepared, for example, by condensation of equimolar amounts of a saturated or an aromatic dicarboxylic acid of 4 to 12 carbon atoms with a saturated or aromatic diamine of up to 14 carbon atoms or by condensation of ω-aminocarboxylic acids or polyaddition of corresponding lactams.

Examples of such polyamides are polyhexamethyleneadipamide (nylon 66), polyhexamethylene azelaamide (nylon 69), polyhexamethylene sebacamide (nylon 610), polyhexamethylene dodecanediamide (nylon 612), polyamides, such as polycaprolactam and polylaurolactam, obtained by ring cleavage of lactams, and poly-11-aminoundecanoic acid and a polyamide obtained from di(p-aminocyclohexyl)methane and dodecanedioic acid.

It is also possible to use polyamides which have been prepared by copolycondensation of two or more of the abovementioned polymers or their components, for example copolymers of adipic acid, isophthalic acid or terephthalic acid and hexamethylenediamine or copolymers of caprolactam, terephthalic acid and hexamethylenediamine. Such partially aromatic copolyamides contain from 40 to 90% by weight of units which are derived from terephthalic acid and hexamethylenediamine. A small amount of terephthalic acid, preferably not more than 10% by weight, based on the total aromatic dicarboxylic acids used, can be replaced by isophthalic acid or other aromatic dicarboxylic acids, preferably those in which the carboxyl groups are in the para position.

Other suitable monomers are cyclic diamines, such as those of the general formula V

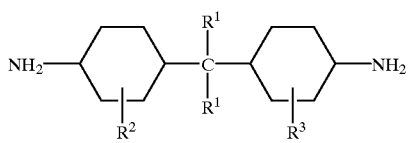

(V)

where

R¹ is hydrogen or $C_1$–$C_4$-alkyl and

R² and R³ are each $C_1$–$C_4$-alkyl or hydrogen.

Particularly preferred diamines V are bis(4-aminocyclohexyl)methane, bis(4-amino-3-methylcyclohexyl)methane, 2,2-bis(4-aminocyclohexyl) propane and 2,2-bis(4-amino-3-methylcyclohexyl)propane.

Examples of further diamines V are 1,3- and 1,4-cyclohexanediamine and isophoronediamine.

In addition to the units which are derived from terephthalic acid and hexamethylenediamine, the partly aromatic copolyamides contain units which are derived from ε-caprolactam and/or units which are derived from adipic acid and hexamethylenediamine.

The amount of units which are derived from ε-caprolactam is up to 50, preferably from 20 to 50, in particular from 25 to 40, % by weight, while the amount of units which are derived from adipic acid and hexamethylenediamine is up to 60, preferably from 30 to 60, in particular from 35 to 55, % by weight.

The copolyamides may also contain both units of ε-caprolactam and units of adipic acid and hexamethylenediamine; in this case, it must be ensured that the amount of units which are free of aromatic groups is at least 10, preferably at least 20, % by weight. The ratio of the units which are derived from ε-caprolactam to those derived from adipic acid and hexamethylenediamine is not subject to any particular restriction.

Polyamides having from 50 to 80, in particular from 60 to 75, % by weight of units which are derived from terephthalic acid and hexamethylenediamine and from 20 to 50, preferably from 25 to 40, % by weight of units which are derived from ε-caprolactam have proven particularly advantageous for many intended uses.

The partly aromatic copolyamides can be prepared, for example, by the process described in EP-A-129 195 and EP 129 196.

Preferred partly aromatic polyamides are those which contain less than 0.5% by weight of triamine units, in particular units of dihexamethylenetriamine. Particularly preferred partly aromatic polyamides are those having triamine contents of 0.3% by weight or less.

Linear polyamides having a melting point above 200° C. are preferred.

Preferred polyamides are polyhexamethylene adipamide, polyhexamethylene sebacamide and polycaprolactam, as well as polyamide 6/6T and polyamide 66/6T and polyamides which contain cyclic diamines as comonomers. The polyamides generally have a relative viscosity of from 2.0 to 5, determined in a 1% strength by weight solution in 96% strength sulfuric acid at 23° C., which corresponds to a number average molecular weight of from about 15,000 to 45,000. Polyamides having a relative viscosity of from 2.4 to 3.5, in particular from 2.5 to 3.4, are preferably used.

Other examples of polyamides are those which are obtainable, for example, by condensation of 1,4-diaminobutane with adipic acid at elevated temperatures (polyamide 4,6). Preparation processes for polyamides having this structure are described, for example, in EP-A 38 094, EP-A 38 582 and EP-A 39 524.

The amount of polyamides D may be from 1 to 99, preferably from 10 to 90, particularly from 10 to 40, % by weight, based on the molding materials.

Component E

In addition to the components A to D, the molding materials may also contain up to 25, preferably from 2 to 20, % by weight of a rubber impact modifier E. Conventional impact modifiers which are suitable for polyamides and/or polyarylene ethers may be used.

Rubbers which increase the toughness of the polyamides generally have two essential features: they contain an elastomeric segment which has a glass transition temperature of less than −10° C., preferably less than −30° C., and they contain at least one functional group which may interact with the polyamide. Examples of suitable functional groups are carboxyl, carboxylic anhydride, carboxylic ester, carboxamido, carboximido, amino, hydroxyl, epoxy, urethane and oxazoline groups.

Examples of rubbers which increase the toughness of the blends are the following:

EP and EPDM rubbers which were grafted with the abovementioned functional groups. Suitable graft reagents are, for example, maleic anhydride, itaconic acid, acrylic acid, glycidyl acrylate and glycidyl methacrylate.

These monomers may be grafted onto the polymer in the melt or in solution, in the presence or absence of a free radical initiator, such as cumyl hydroperoxide.

Copolymers of α-olefins may also be mentioned. The α-olefins are usually monomers of 2 to 8 carbon atoms, preferably ethylene and propylene. Comonomers which have proven suitable are alkyl acrylates or alkyl methacrylates which are derived from alcohols of 1 to 8 carbon atoms, preferably from ethanol, butanol or ethylhexanol, and reactive comonomers, such as acrylic acid, methacrylic acid, maleic acid, maleic anhydride, or glycidyl (meth)acrylate, and furthermore vinyl esters, in particular vinyl acetate. Mixtures of different comonomers may also be used.

Copolymers of ethylene with ethyl or butyl acrylate and acrylic acid and/or maleic anhydride have proven particularly suitable.

The copolymers can be prepared in a high-pressure process at from 400 to 4500 bar, or by grafting the comonomers onto the poly-α-olefin. The amount of α-olefin is in general from 99.95 to 55% by weight, based on the copolymer.

A further group of suitable elastomers comprises core-shell graft rubbers. These are graft rubbers which are prepared in emulsion and comprise at least one hard and one soft component. A hard component is usually understood as meaning a polymer having a glass transition temperature of at least 25° C., while a soft component is usually understood as meaning a polymer having a glass transition temperature of not more than 0° C. These products have a structure comprising a core and at least one shell, the structure being determined by the order of addition of the monomers. The soft components are derived in general from butadiene, isoprene, alkyl acrylates, alkyl methacrylates or siloxanes and, if required, further comonomers. Suitable siloxane cores can be prepared, for example, starting from cyclic oligomeric octamethyltetrasiloxane or tetravinyltetramethyltetrasiloxane. These may be reacted, for example, with γ-mercaptopropylmethyldimethoxysilane in a cationic polymerization with ring cleavage, preferably in the presence of sulfonic acids, to give the soft siloxane cores. The siloxanes may also be crosslinked, by, for example, carrying out the polymerization reaction in the presence of silanes having hydrolyzable groups, such as halogen or alkoxy, for example tetraethoxysilane, methyltrimethoxysilane or phenyltrimethoxysilane. Examples of suitable comonomers here are styrene, acrylonitrile and crosslinking or graft-linking monomers having more than one polymerizable double bond, such as diallyl phthalate, divinylbenzene, butanediol diacrylate or triallyl (iso)cyanurate. The hard components are derived in general from styrene, α-methylstyrene and copolymers thereof, with acrylonitrile, methacrylonitrile and methyl methacrylate preferably being mentioned as comonomers here.

Preferred core-shell graft rubbers contain a soft core and a hard shell or a hard core, a first soft shell and at least one further hard shell. Functional groups, such as carbonyl, carboxyl, anhydride, amido, imido, carboxylic ester, amino, hydroxyl, epoxy, oxazoline, urethane, urea, lactam or halobenzyl groups, are preferably incorporated here by adding suitably functionalized monomers during the polymerization of the last shell. Suitable functionalized monomers are, for example, maleic acid, maleic anhydride, mono- or diesters of maleic acid, tert-butyl (meth)acrylate, acrylic acid, glycidyl (meth)acrylate and vinyloxazoline. The amount of monomers having functional groups is in general from 0.1 to 25, preferably from 0.25 to 15, % by weight, based on the total weight of the core-shell graft rubber. The weight ratio of soft to hard components is in general from 1:9 to 9:1, preferably from 3:7 to 8:2.

Such rubbers which increase the toughness of polyamides are known per se and are described, for example, in EP-A 208 187.

A further group of suitable impact modifiers comprises thermoplastic polyester elastomers. Polyester elastomers are understood as meaning segmented copolyether esters which contain long-chain segments which are derived as a rule from poly(alkylene) ether glycols and short-chain segments which are derived from low molecular weight diols and dicarboxylic acids. Such products are known per se and are described in the literature, for example in U.S. Pat. No. 3,651,014. Appropriate products are also commercially available under the names Hytrel® (Du Pont), Arnitel® (Akzo) and Pelprene® (Toyobo Co. Ltd.).

Mixtures of different rubbers can of course also be used.

In addition to the components A to E described, the novel molding materials may also contain, for example, up to 40% by weight of other additives, such as flameproofing agents, dyes, pigments, stabilizers and lubricants.

The novel molding materials can be prepared by methods known per se, for example extrusion.

If the novel thermoplastic molding materials contain further components in addition to the polyarylene ethers A, the molding materials can be prepared, for example, by mixing the starting components in a conventional mixing apparatus, such as an extruder, preferably a twin-screw extruder, a Brabender mill or a Banbury mill, or a kneader, and then carrying out extrusion. After the extrusion, the extrudate is usually cooled and comminuted.

The order in which the components are mixed may be varied; for example, two or, if required, three components may be premixed, but it is also possible to mix all components together.

Thorough mixing is advantageous for obtaining a very homogeneous molding material. Average mixing times of from 0.2 to 30 minutes at from 280 to 380° C. are generally required for this purpose.

The filler-containing molding materials have very good toughnesses and strengths. They are also distinguished by their very good stability to processing and hydrolysis. They are therefore suitable, for example, for the production of moldings which are exposed to high mechanical stresses or chemical influences.

EXAMPLES

In the examples below, the amount of terminal anhydride groups was determined by FT-IR spectroscopy.

The viscosity number (VN) of the product was determined in 1% strength solution in N-methylpyrrolidone at 25° C.

The concentration of terminal hydroxyl groups was measured by potentiometric titration in dimethylformamide with methanol KOH solution. For this purpose, 1 g of each polymer was dissolved in dimethylformamide and titrated. The percentages by weight of the terminal hydroxyl groups were calculated by dividing the weight of the hydroxyl groups determined by titration by the particular weight of the polymer sample and multiplying the result by 100.

The melt stability of the molding materials was determined by measuring the melt volume index (MVI) of the melt after standing for 4 and 24 minutes at 400° C. and 340° C. and under a load of 21.6 kg and 10 kg. The change which occurs during this time is expressed as a numerical value, based on the initial value (in percent).

The dried granules of the molding materials were injection molded to give standard small bars (50×6×4 mm) and round disks (diameter 60 mm, thickness 2 mm) and tensile test bars (150×20 (10)×4 mm).

The modulus of elasticity [$N/mm^2$] was determined according to DIN 53 457 from the slope of the tangent at the origin of the tensile stress curve at a test speed of 1 mm per minute on tensile test bars (mean value 10 tests).

The notched impact strengths ($a_k$ [$kJ/m^2$]) were determined on standard small bars according to DIN 53 453 by subjecting the freely supported standard small bars to an abrupt impact, the energy for breaking the bars being determined (10 individual tests).

The total penetration energies (Wtot N/m) were determined on round disks according to DIN 53 443 by penetrating a firmly clamped round disk with a penetration element at constant speed (4.5 m/s). The total penetration energy was determined from the force/deformation curve (5 individual measurements).

The decrease in the tensile strength (in percent) before and after storage of tensile test bars for 100 hours in water at 130° C. in an autoclave was determined as a measure of the stability to hydrolysis. The tensile strength ($\sigma_B$ [$N/mm^2$]) was measured by means of the tensile test according to DIN 53 455 (10 individual measurements on tensile test bars).

Example 1

400 g of a polyarylene ether obtained from 4,4'-di-(4-hydroxyphenyl) sulfone and 4,4'-dichlorodiphenyl sulfone (VN=55 ml/g, 0.12% by weight of terminal OH groups) were dissolved in 1200 ml of N-methylpyrrolidone. The solution was heated to 180° C. After the addition of 5.4 g of potassium fluoride and 11.1 g of 4-fluorophthalic anhydride, stirring was carried out for 1 hour. The reaction product was isolated by precipitation in water.

The content of terminal phthalic anhydride groups was 0.9% by weight. The viscosity number of the product was 52.4 ml/g.

The polyarylene ether thus prepared was used as component $A_1$ in the molding materials.

17

Example 2

400 g of a polyarylene ether obtained from 4,4'-di-(4-hydroxyphenyl) sulfone and 4,4'-dichlorodiphenyl sulfone (VN=44 ml/g, 0.25% by weight of terminal OH groups) were dissolved in 1200 ml of N-methylpyrrolidone. The solution was heated to 180° C. After the addition of 11.6 g of potassium fluoride and 23.7 g of 4-fluorophthalic anhydride, stirring was carried out for 3 hours. The reaction product was isolated by precipitation in water.

The content of terminal phthalic anhydride groups was 1.76% by weight. The viscosity number was 43 ml/g.

The polyarylene ether thus prepared was used as component $A_2$ in the molding materials.

Example 3

Under a nitrogen atmosphere, 4.593 kg of dichlorodiphenyl sulfone and 4.002 kg of dihydroxydiphenyl sulfone were dissolved in 29 kg of N-methylpyrrolidone, and 2.923 kg of anhydrous potassium carbonate were added. The reaction mixture was first heated at 180° C. for 1 hour at 300 mbar with continuous removal of the water of reaction and N-methylpyrrolidone by distillation, and was then reacted further for 6 hours at 190° C.

After this time, 235 g of 4-fluorophthalic anhydride and 115 g of potassium fluoride were added to the mixture and the reaction was continued for 0.2 hour at 190° C.

After the addition of 40 kg of N-methylpyrrolidone, the inorganic components were filtered off and the polymer was isolated by precipitation in water. Drying at 160° C. gave a white product whose phthalic anhydride content was 0.78% by weight. The viscosity number of the polyarylene ether was 51.2 ml/g.

The product thus prepared was used as component $A_3$ in the molding materials.

Example 4

Under a nitrogen atmosphere, 4.593 kg of dichlorodiphenyl sulfone and 3.6524 kg of bisphenol A were dissolved in 29 kg of N-methylpyrrolidone, and 2.923 kg of anhydrous potassium carbonate were added.

The reaction mixture was first heated at 180° C. for 1 hour at 300 mbar with continuous removal of the water of reaction and N-methylpyrrolidone by distillation, and was then reacted further for 6 hours at 190° C.

After this time, 235 g of 4-fluorophthalic anhydride and 115 g of potassium fluoride were added to the mixture and the reaction was continued for 0.25 hour at 190° C.

After the addition of 40 kg of N-methylpyrrolidone, the inorganic components were filtered off and the polymer was isolated by precipitation in water. Drying at 160° C. gave a white product whose phthalic anhydride content was 0.71% by weight. The viscosity number of the product was 53.3 ml/g.

The polyarylene ether thus prepared was used as component $A_4$ in the molding materials.

Comparative Example

Polyarylene ether having terminal anhydride groups bonded via ester groups 400 g of polyarylene ether obtained from 4,4'-di-(4-hydroxyphenyl) sulfone and 4,4'-dichlorodiphenyl sulfone

18

(VN=55 ml/g, 0.12% by weight of terminal OH groups) were dissolved in 1200 ml of absolute N-methylpyrrolidone. The solution was then heated to 80° C. After the addition of 5.1 g of triethylamine, 10.5 g of trimellitic anhydride chloride, dissolved in 50 ml of tetrahydrofuran, were added over a period of 30 minutes. After the end of the addition, the reaction mixture was kept at 80° C. for a further 2 hours. The reaction product was isolated by precipitation in water.

The content of trimellitic anhydride terminal groups was 1.45% by weight. The viscosity number of the polyarylene ether was 55 ml/g.

The product thus prepared was used as component $A_v$ in the molding materials.

Component $B_1$

Polyarylene ether obtained from 4,4'-dihydroxydiphenyl sulfone and 4,4'-dichlorodiphenyl sulfone (VN=59 ml/g, measured in 1% strength solution in a 1:1 mixture of phenol and 1,2-dichlorobenzene; eg. commercial product Ultrason® E 2010, BASF) and having essentially terminal chlorine and methoxy groups.

Component $B_2$

Polyarylene ether obtained from bisphenol A and 4,4'-dichlorodiphenyl sulfone (VN=64 ml/g, measured in 1% strength solution in a 1:1 mixture of phenol and 1,2-dichlorobenzene; eg. commercial product Ultrason® S 2010, BASF) and having essentially terminal chlorine and methoxy groups.

Component $C_1$

Glass rovings having a thickness of 10 µm and comprising E glass, which were treated with a polyurethane size. After incorporation, the average lengths of the glass fibers were from about 0.1 to 0.5 mm.

Component $D_1$

Polyhexamethylene adipamide having a K value (according to Fikentscher) of 76, corresponding to a relative viscosity $\eta_{rel}$ of 2.95, measured in a 1% strength by weight solution in 96% strength sulfuric acid.

Component $D_2$

Partly aromatic copolyamide, obtained by condensation of 55 parts by weight of terephthalic acid, 35 parts by weight of ε-caprolactam and 38.5 parts by weight of hexamethylenediamine and having a relative viscosity of 2.4 (measured as a 1% strength by weight solution in 96% strength sulfuric acid) and a triamine content of 0.27% by weight.

Component $D_3$

Partly aromatic copolyamide, obtained by condensation of 39.1 parts by weight of hexamethylenediamine, 37.5 parts by weight of terephthalic acid, 20.6 parts by weight of isophthalic acid and 2.9 parts by weight of bis(4-aminocyclohexyl)methane and having a relative viscosity of 2.3 (measured as a 1% strength by weight solution in 96% strength sulfuric acid).

Component E

Ethylene/propylene rubber modified with 0.7% by weight of maleic acid/maleic anhydride and having an MFI of 3 g per 10 min (measured at 2.16 kg/230° C.).

Preparation of the molding materials

The components were mixed in a twin-screw extruder at a melt temperature of from 310 to 340° C. The melt was passed through a waterbath and granulated, dried and processed to give test specimens.

The results of the testing of the performance characteristics are shown in the tables below.

TABLE 1

Glass fiber-reinforced molding materials

| | \multicolumn{9}{c}{Molding material No.} | | | | | | | | |
|---|---|---|---|---|---|---|---|---|---|
| | V1 | V2 | 1 | 2 | 3 | 4 | 5 | V3 | 6 |
| Component [% by weight] | | | | | | | | | |
| $A_1$ | — | — | 5 | — | — | — | — | — | — |
| $A_2$ | — | — | — | 5 | — | — | — | — | — |
| $A_3$ | — | — | — | — | 5 | 20 | 40 | — | — |
| $A_4$ | — | — | — | — | — | — | — | — | 5 |
| $A_V$ | — | 5 | — | — | — | — | — | — | — |
| $B_1$ | 70 | 65 | 65 | 65 | 65 | 50 | 30 | — | — |
| $B_2$ | — | — | — | — | — | — | — | 70 | 65 |
| C | 30 | 30 | 30 | 30 | 30 | 30 | 30 | 30 | 30 |
| Properties | | | | | | | | | |
| Impact strength [kJ/m$^2$] | 22.9 | 26.8 | 27 | 29.1 | 26.4 | 32.0 | 37.1 | 23.2 | 27.1 |
| Modulus of elasticity [N/mm$^2$] | 9300 | 9250 | 9300 | 9300 | 9250 | 9200 | 9200 | 8900 | 8950 |
| Tensile strength [N/mm$^2$] | 133 | 142 | 143 | 149 | 141 | 164 | 174 | 127 | 140 |
| Melt stability [%] | 27 | 87 | 32 | 36 | 29 | 32 | 36 | 21 | 25 |

V1; V2; V3: Comparative experiments

The experiments show that the novel glass fiber-reinforced molding materials have higher impact strengths and tensile strengths than glass fiber-reinforced molding materials based on polyarylene ethers which contain no terminal anhydride groups. In comparison with the molding material which contains polyarylene ethers having terminal anhydride groups fixed via an ester group, the novel glass fiber-reinforced molding materials are additionally distinguished by better melt stabilities.

Table 2

Polyamide-containing molding materials

TABLE 2

Polyamide-containing molding materials

| | \multicolumn{11}{c}{Molding material No.} | | | | | | | | | | |
|---|---|---|---|---|---|---|---|---|---|---|---|
| | V4 | V5 | 7 | V6 | 8 | 9 | V7 | 10 | 11 | 12 | 13 |
| Component [% by weight] | | | | | | | | | | | |
| $A_2$ | — | — | 15 | — | — | — | — | — | — | — | — |
| $A_3$ | — | — | — | — | 10 | 25 | — | — | 10 | 40 | 60 |
| $A_V$ | — | 15 | — | — | — | — | 10 | — | — | — | — |
| $B_1$ | 84 | 69 | 69 | 66 | 56 | 41 | 66 | 56 | 56 | 26 | 6 |
| $D_1$ | 16 | 16 | 16 | — | — | — | — | — | — | — | — |
| $D_2$ | — | — | — | 34 | 34 | 34 | 28 | 28 | 28 | 28 | 28 |
| E | — | — | — | — | — | — | 6 | 6 | 6 | 6 | 6 |
| Properties | | | | | | | | | | | |
| Total penetration energy [Nm] | 0.5 | 23 | 24 | 1 | 34 | 42 | 1 | 59 | 58 | 66 | 69 |
| Notched impact strength [kJ/m$^2$] | 1.2 | 3.2 | 3.1 | 1 | 4.1 | 5 | 1.2 | 3.7 | 3.9 | 11 | 14.1 |
| Melt stability* [%] | 42 | 79 | 49 | 27 | 31 | 34 | 29 | 51 | 32 | 34 | 36 |
| Decrease in tensile strength [%] | 34 | 36 | 12 | nm | nm | nm | 26 | 24 | 11 | 10 | 10 |

V4 to V7: Comparative experiments
*The MVI values were measured at 340° C. and under a load of 10 kg.
nm = not measured The novel molding materials have improved stability to hydrolysis and good mechanical properties.

TABLE 3

Polyamide-containing molding materials

| Component [% by weight] | Molding material No. | | | | | |
|---|---|---|---|---|---|---|
| | V8 | V9 | 14 | V10 | 15 | 15 |
| $A_3$ | — | — | 10 | — | — | — |
| $A_4$ | — | — | — | — | 10 | 50 |
| $A_V$ | — | 10 | — | — | — | — |
| $B_1$ | 66 | 56 | 56 | — | — | — |
| $B_2$ | — | — | — | 66 | 56 | 16 |
| $D_3$ | 34 | 34 | 34 | 34 | 34 | 34 |
| Properties | | | | | | |
| Total penetration energy [Nm] | 1 | 33 | 32 | 2 | 29 | 37 |
| Notched impact strength [kJ/m²] | 1.5 | 5.1 | 5.6 | 1.7 | 4.7 | 8.2 |
| Melt stability* [%] | 4 | 33 | 5 | 4 | 5 | 6 |
| Decrease in tensile strength [%] | 24 | 25 | 9 | nm | nm | nm |

V8 to V10: Comparative experiments
nm: not measured
*The MVI values were determined at 340° C. and under a load of 10 kg.

We claim:

1. A process for the preparation of polyarylene ethers having repeating units of the formula I

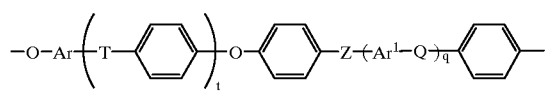
(I)

where
t and q may each be an integer 0, 1, 2 or 3,
T, Q and Z may each be a chemical bond or a group selected from —O—, —S—, —SO$_2$—, S=O, C=O, —N=N—, —R$^a$C=CR$^b$— and —CR$^c$R$^d$—, with the proviso that at least one of the groups T, Q or Z is —SO$_2$— or C=O and, if t and q are 0, Z is —SO$_2$— or C=O,
R$^a$ and R$^b$ are each hydrogen or C$_1$–C$_{10}$-alkyl,
R$^c$ and R$^d$ are each hydrogen, C$_1$–C$_{10}$-alkyl, C$_1$–C$_{10}$-alkoxy or C$_6$–C$_{18}$-aryl, where the abovementioned groups may each be substituted by fluorine and/or chlorine, or, together with the carbon atom to which they are bonded, form a C$_4$–C$_7$-cycloalkyl group which may be substituted by one or more C$_1$–C$_6$-alkyl groups, and Ar and Ar$^1$ are each C$_6$–C$_{18}$-aryl which may be unsubstituted or substituted by C$_1$–C$_{10}$-alkyl, C$_6$–C$_{18}$-aryl, C$_1$–C$_{10}$-alkoxy or halogen,
and terminal anhydride groups of the formula II

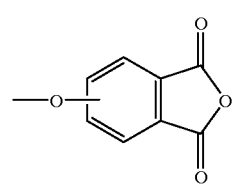
(II)

(polyarylene ether A), wherein polyarylene ethers having repeating units of the formula I and terminal hydroxyl groups (polyarylene ethers A') are reacted with phthalic anhydrides of the formula III

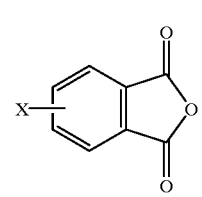
(III)

where X is fluorine, chlorine, bromine or iodine, in a solvent in the presence of potassium fluoride.

2. A process as claimed in claim 1, wherein the reaction is carried out in the presence of potassium carbonate.

3. A process as claimed in claim 1, wherein polyarylene ethers A' having from 0 to 100 mol % of repeating units I$_1$

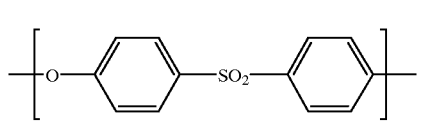
(I$_1$)

and from 0 to 100 mol % of repeating units I$_2$

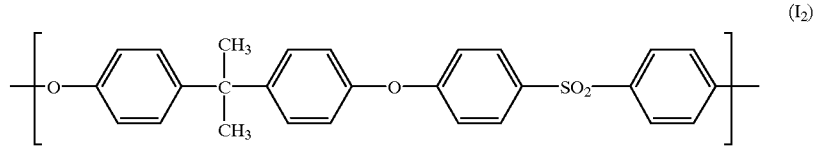
(I$_2$)

are used.

4. A molding material containing, based on the sum of components A to C,

A) from 5 to 99% by weight of polyarylene ether A, which has repeating units of the formula I

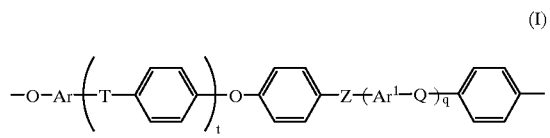
(I)

where
t and q may each be an integer 0, 1, 2 or 3,
T, Q and Z may each be a chemical bond or a group selected from —O—, —S—, —SO$_2$—, S=O, C=O, —N=N—, —R$^a$C=CR$^b$— and —CR$^c$R$^d$—, with the proviso that at least one of the groups T, Q or Z is —SO$_2$— or C=O and, if t and q are 0, Z is —SO$_2$— or C=O,
R$^a$ and R$^b$ are each hydrogen or C$_1$–C$_{10}$-alkyl,
R$^c$ and R$^d$ are each hydrogen, C$_1$–C$_{10}$-alkyl, C$_1$–C$_{10}$-alkoxy or C$_6$–C$_{18}$-aryl, where the abovementioned groups may each be substituted by fluorine and/or chlorine, or, together with the carbon atom to which they are bonded, form a C$_4$–C$_7$-cycloalkyl group which may be substituted by one or more C$_1$–C$_6$-alkyl groups, and
Ar and Ar$^1$ are each C$_6$–C$_{18}$-aryl which may be unsubstituted or substituted by C$_1$–C$_{10}$-alkyl, C$_6$–C$_{18}$-aryl, C$_1$–C$_{10}$-alkoxy or halogen,
and terminal anhydride groups of the formula II

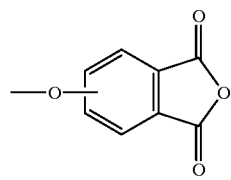
(II)

B) from 0 to 90% by weight of polyarylene ether B having terminal groups which differ from those of the polyarylene ether A, and having repeating units of the formula IV

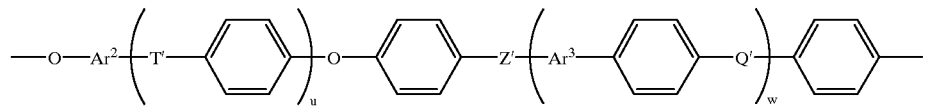
(IV)

where u and w have the same meanings as t and q in formula I, T', Q' and Z' have the same meanings as T, Q and Z in formula I and Ar$^2$ and A$^3$ have the same meanings as Ar and Ar$^1$ in formula I, and C) from 1 to 45% by weight of fibrous or particulate reinforcing materials or fillers or mixtures thereof.

5. A molding material containing, based on the sum of the components A to E,
A) from 1 to 99% by weight of polyarylene ether A, which has repeating units of the formula I

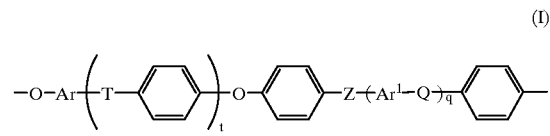
(I)

where t and q may each be an integer 0, 1, 2 or 3,
T, Q and Z may each be a chemical bond or a group selected from —O—, —S—, —SO$_2$—, S=O, C=O, —N=N—, —R$^a$C=CR$^b$— and —CR$^c$R$^d$—, with the proviso that at least one of the groups T, Q or Z is —SO$_2$— or C=O and, if t and q are 0, Z is —SO$_2$— or C=O,
R$^a$ and R$^b$ are each hydrogen or C$_1$–C$_{10}$-alkyl,
R$^c$ and R$^d$ are each hydrogen, C$_1$–C$_{10}$-alkyl, C$_1$–C$_{10}$-alkoxy or C$_6$–C$_{18}$-aryl, where the abovementioned groups may each be substituted by fluorine and/or chlorine, or, together with the carbon atom to which they are bonded, form a C$_4$–C$_7$-cycloalkyl group which may be substituted by one or more C$_1$–C$_6$-alkyl groups, and
Ar and Ar$^1$ are each C$_6$–C$_{18}$-aryl which may be unsubstituted or substituted by C$_1$–C$_{10}$-alkyl, C$_6$–C$_{18}$-aryl, C$_1$–C$_{10}$-alkoxy or halogen,
and terminal anhydride groups of the formula II

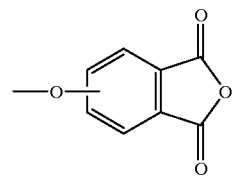
(II)

B) from 0 to 90% by weight of polyarylene ether B having terminal groups which differ from those of the polyarylene ether A, and having repeating units of the formula IV

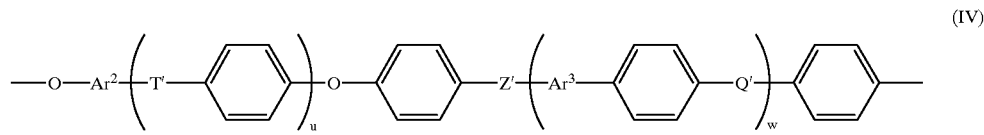
(IV)

where u and w have the same meanings as t and q in formula I, T', Q' and Z' have the same meanings as T, Q and Z in formula I and $Ar^2$ and $Ar^3$ have the same meanings as Ar and $Ar^1$ in formula I, C) from 0 to 45% by weight of fibrous or particulate reinforcing materials or fillers or mixtures thereof, D) from 1 to 99% by weight of thermoplastic polyamides D and E) from 0 to 25% by weight of rubber impact modifiers E.

6. A molding material as claimed in claim 5, in which the polyarylene ethers A used are those containing from 0 to 100 mol % of repeating units $I_1$

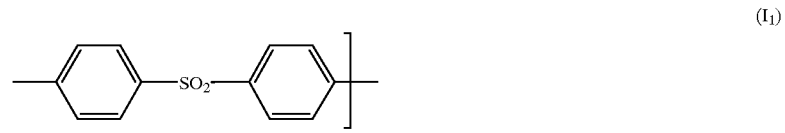
($I_1$)

and from 0 to 100 mol % of repeating units $I_2$

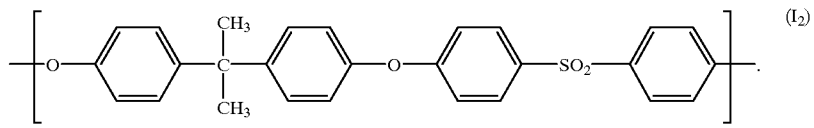
($I_2$)

7. A molding material as claimed in claim 5, containing polyamide D comprising, based on the polyamide D, from 40 to 90% by weight of units which are derived from terephthalic acid and hexamethylenediamine, from 0 to 50% be weight of units which are derived from ε-caprolactam or from 0 to 60% by weight of units which are derived from adipic acid and hexamethylenediamine.

8. A molding, fiber or film obtained from a molding material as claimed in claim 5.

* * * * *

UNITED STATES PATENT AND TRADEMARK OFFICE
CERTIFICATE OF CORRECTION

PATENT NO.: 5,998,533

DATED: December 7, 1999

INVENTOR(S): WEBER et al.

It is certified that error appears in the above-identified patent and that said Letters Patent is hereby corrected as shown below:

```
Title page, item [57],
```
In the abstract, line 10 (line 7 after formula I), "C-O" should be --C=O--.

Signed and Sealed this

Twenty-seventh Day of June, 2000

Attest:

Q. TODD DICKINSON

*Attesting Officer*  *Director of Patents and Trademarks*